United States Patent [19]
Yamada et al.

[11] Patent Number: 5,104,836
[45] Date of Patent: Apr. 14, 1992

[54] DIELECTRIC CERAMICS FOR HIGH FREQUENCY

[75] Inventors: Akira Yamada; Toshihisa Honda; Hisao Watarai, all of Amagasaki, Japan

[73] Assignee: Mitsubishi Denki Kabushiki Kaisha, Tokyo, Japan

[21] Appl. No.: 661,805

[22] Filed: Feb. 27, 1991

[30] Foreign Application Priority Data

Mar. 5, 1990 [JP] Japan .................................. 2-52957

[51] Int. Cl.$^5$ ............................................. C04B 35/46
[52] U.S. Cl. ..................................... 501/136; 501/135
[58] Field of Search ..................... 501/134, 135, 136

[56] References Cited

U.S. PATENT DOCUMENTS

| | | | |
|---|---|---|---|
| 4,761,242 | 8/1988 | Suzuki et al. | 252/62.9 |
| 4,781,859 | 11/1988 | Noi | 252/520 |
| 4,859,641 | 8/1989 | Futino et al. | 501/136 |
| 4,900,702 | 2/1990 | Tsuboi et al. | 501/134 |
| 5,002,913 | 3/1991 | Yamada et al. | 501/136 |

*Primary Examiner*—Karl Group
*Assistant Examiner*—Chris Gallo
*Attorney, Agent, or Firm*—Wolf, Greenfield & Sacks

[57] ABSTRACT

A dielectric ceramics for high frequencies having a structure being represented by the following general formula:

$$Sr_{3(1-x)}Ca_{3x}Ti_2O_7 \text{ (where: } 0.66 < x \leq 0.84).$$

The dielectric ceramics is produced by blending and sintering strontium carbonate, calcium carbonate and titanium oxide.

2 Claims, No Drawings

DIELECTRIC CERAMICS FOR HIGH FREQUENCY

BACKGROUND OF THE INVENTION

1. Field of the Invention

This invention relates to dielectric ceramics for high frequencies, which indicates a particularly high dielectric constant and high Q value at micro-wave frequencies.

2. Description of the Related Art

The dielectric ceramics for high frequency has a wide range of applications in the fields of portable wireless apparatuses, satellite broadcasting, micro-wave integrated circuits, etc. Above all, these dielectric ceramics are used as the dielectric resonators for improving the filter characteristics and frequency stability, which accelerate reduction in size of the instruments and circuits used in the above applications. The following characteristics of the dielectric ceramics are required when it is used in the microwave region: (1) a high dielectric constant for the reduction in size of the resonator, since the size of the dielectric resonator is in inverse proportion to the square root of the dielectric constant; (2) a low dielectric loss; and (3) an excellent temperature stability of resonant frequency.

As well known dielectric ceramics having such characteristics as mentioned above, there can be exemplified a compound as disclosed in, for example, Japanese Patent Laid-Open No. 198505/1986 to be represented by the following general formula: $aSrO \cdot bCaO \cdot cTiO_2 \cdot dSnO_2$ (where $0.39 \leq a \leq 0.70$, $0 \leq b \leq 0.28$, $0.27 \leq c \leq 0.35$, $0 \leq d \leq 0.04$, $a+b+c+d=1$), so forth.

However, it is generally very difficult to attain both a high relative dielectric constant and a low dielectric loss. To be precise, the relative dielectric constant of the above mentioned conventional dielectric ceramics is about 40, and Q value (1/dielectric loss) thereof indicates a range from several thousands to 15,000 or so. While such dielectric ceramics exists in a comparatively large quantity, the ceramics materials having relative high dielectric constant are recognized to have a tendency to increase their dielectric loss, remarkably. The current situation is that those ceramics materials having their relative dielectric constant of 80 and indicating the Q value of 1,000 at the same measuring frequency, as mentioned above, are available only in a very small quantity.

SUMMARY OF THE INVENTION

The present invention has been made with a view to solving such problems as previously mentioned, and aims at providing a dielectric ceramic for high frequency which has relative dielectric constant of above 80 and a sufficiently high Q value of 1,000 or above, even in a microwave region, and which easily provides wide range of relative dielectric constants.

In achieving the above objective, the present invention proposes a dielectric ceramic for high frequency being represented by the following general formula:

$$Sr_{3(1-x)}Ca_{3x}Ti_2O_7 \text{ (where: } 0.66 < x \leq 0.84\text{)}.$$

The dielectric ceramics for high frequency proposed by the present invention is obtained by blending, for example, strontium carbonate, calcium carbonate and titanium oxide at their predetermined ratio, and sintering the mixture. The dielectric ceramics can be represented by the general formula of:

$$Sr_{3(1-x)}Ca_{3x}Ti_2O_7 \text{ (where: } 0.66 < x \leq 0.84\text{)}.$$

While it is not easy to define primarily the limit quantity of the dielectric ceramics material, which varies to some extent depending on the conditions for its production, it can be said basically that, when the x value becomes equal to, or smaller than 0.66 ($x \leq 0.66$; which is outside the above-mentioned compositional range) Q value decreases, whereby it becomes difficult to attain the performance required of the ceramics material. Also, when the x value is greater than 0.84 ($x > 0.84$), the relative dielectric constant and its Q value decreases, and the required characteristics at the frequency of 6 GHz, of the relative dielectric constant (above 80) and its Q value (equal to or above 1,000) can no longer be satisfied.

DETAILED DESCRIPTION

To those persons who would readily practice the present invention, the following preferred embodiments are presented along with comparative embodiments of conventional dielectric ceramics materials.

The producing method of the dielectric ceramics related to the embodiments of the present invention follows. Firstly, powders of strontium carbonate, calcium carbonate, and titanium oxide, all being available in general market, were weighed for the compositional ratios of the specimens as shown in the following Table 1 (specimens No. 1 through 10). The material powders were then charged into a ball mill pot made of Nylon, together with zirconia ball and ethyl alcohol, and the batch was mixed for 16 hours. Thereafter, the mixed slurry was dried for three hours at a temperature of 100° C., followed by pulverizing the dried substance. Following this, the pulverized substance was calcined for three hours at a temperature of 1,000° C., thereby obtaining a compound powder. This compound was further pulverized in the ball mill under the same conditions as mentioned above, followed by drying the same. The thus obtained powder was then shaped into a cylindrical column of 10 mm in diameter and about 10 mm in height under a pressure of 700 to 800 kg/cm². This shaped body was then sintered in an oxygen or oxygen-containing atmosphere at a temperature ranging from 1,500° C. to 1,550° C. for three hours. As the result, the dielectric ceramics was obtained according to the preferred embodiments of the present invention (No. 4 through 13) and the comparative examples (No. 1 through 3, and No. 14 through 18).

Each of the specimen ceramics obtained in the above described manner was machined to a predetermined dimension, after which it was measured for its dielectric characteristics (relative dielectric constant and Q value) at the frequency of 6 GHz by the dielectric resonator method. The results of measurements are shown in the following Table 1. As is apparent from the Table, the dielectric ceramics according to the preferred embodiments of the present invention possessed high relative dielectric constant of above 80 and a sufficiently high Q value, even in the microwave region.

TABLE 1

| Specimen No. | x Value | Relative Dielectric Constant | Q value (1/dielectric Loss) |
| --- | --- | --- | --- |
| 1 | 0.60 | 146 | 850 |
| 2 | 0.62 | 148 | 800 |
| 3 | 0.64 | 148 | 810 |
| 4 | 0.66 | 122 | 1000 |
| 5 | 0.68 | 95 | 1400 |
| 6 | 0.70 | 88 | 2050 |
| 7 | 0.72 | 85 | 1900 |
| 8 | 0.74 | 83 | 1800 |
| 9 | 0.76 | 82 | 1850 |
| 10 | 0.78 | 83 | 1300 |
| 11 | 0.80 | 81 | 1050 |
| 12 | 0.82 | 81 | 1070 |
| 13 | 0.84 | 82 | 1020 |
| 14 | 0.86 | 78 | 980 |
| 15 | 0.88 | 75 | 870 |
| 16 | 0.90 | 77 | 800 |
| 17 | 0.95 | 64 | 750 |
| 18 | 1.00 | 52 | 600 |

Moreover, because the generation of the dielectric ceramics for high frequency according to the preferred embodiments of the present invention is easy to control by changing the composition and the sitering temperature, dielectric ceramics with a variety of dielectric constants can be obtained.

As has so far been described in the foregoing, the present invention is able to provide the dielectric ceramics for high frequencies having its dielectric constant of above 80 and sufficiently high Q value of 1,000 or above, even in the microwave region. This can be realized by the use of a compound being represented by a general formula of:

$$Sr_{3(1-x)}Ca_{3x}Ti_2O_7 \text{ (where: } 0.66 < x \leq 0.84).$$

As an example, the use of the dielectric ceramics for high frequency according to the present invention makes it possible to accelerate reduction in size and high performance of those application parts for microwaves such as dielectric resonators.

What is claimed is:

1. A dielectric ceramics for high frequencies having a structure being represented by the following general formula:

$$Sr_{3(1-x)}Ca_{3x}Ti_2O_7 \text{ (where: } 0.66 < x \leq 0.84).$$

2. A producing method of the dielectric ceramics for high frequencies having a structure being represented by the following general formula:

$$Sr_{3(1-x)}Ca_{3x}Ti_2O_7 \text{ (where: } 0.66 < x \leq 0.84),$$

by blending and sintering strontium carbonate, calcium carbonate and titanium oxide.

* * * * *